(12) United States Patent
Reed et al.

(10) Patent No.: US 6,304,427 B1
(45) Date of Patent: Oct. 16, 2001

(54) COMBINATIONS OF MATERIALS TO MINIMIZE ESR AND MAXIMIZE ESR STABILITY OF SURFACE MOUNT VALVE-METAL CAPACITORS AFTER EXPOSURE TO HEAT AND/OR HUMIDITY

(75) Inventors: Erik Karlsen Reed, Mauldin; James Charles Marshall, Simpsonville; Kimberly Lynn Pritchard, Mauldin; Jothi Rajasekaran, Greenville, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/479,211

(22) Filed: Jan. 7, 2000

(51) Int. Cl.$^7$ ....................................................... H01G 9/00
(52) U.S. Cl. .......................... 361/523; 361/532; 361/526; 361/535; 429/101; 429/188
(58) Field of Search ...................................... 361/532, 535, 361/525, 527, 524, 540, 523; 429/101, 188

(56) References Cited

U.S. PATENT DOCUMENTS

| | | | | |
|---|---|---|---|---|
| 3,855,505 | * | 12/1974 | Karlik, Jr. et al. | 317/270 |
| 4,017,773 | * | 4/1977 | Cheseldine | 361/433 |
| 4,814,947 | | 3/1989 | Gunter . | |
| 4,942,101 | * | 7/1990 | Audebert et al. | 429/165 |
| 4,943,892 | * | 7/1990 | Tsuchiya et al. | 361/525 |
| 5,140,502 | * | 8/1992 | Kudoh et al. | 361/540 |
| 5,246,794 | * | 9/1993 | Blomgren et al. | 429/101 |
| 5,372,750 | | 12/1994 | Thoma . | |
| 5,424,907 | * | 6/1995 | Kojima et al. | 361/532 |
| 5,559,667 | * | 9/1996 | Evans | 361/526 |
| 5,729,424 | * | 3/1998 | Sharp et al. | 361/273 |
| 5,754,394 | * | 5/1998 | Evans et al. | 361/516 |
| 5,982,609 | * | 11/1999 | Evans | 361/516 |

FOREIGN PATENT DOCUMENTS

| | | |
|---|---|---|
| 0372519 | 6/1990 | (EP) . |
| 0895259 | 2/1999 | (EP) . |
| 06204096 | 7/1994 | (JP) . |
| 10233346 | 9/1998 | (JP) . |
| 11274003 | 10/1999 | (JP) . |

OTHER PUBLICATIONS

PCT/US00/31793 International Search Report, dated Feb. 2001.

* cited by examiner

*Primary Examiner*—Dean A. Reichard
*Assistant Examiner*—Nguyen Ha
(74) *Attorney, Agent, or Firm*—Banner & Witcoff, LTD

(57) ABSTRACT

Single element and/or multiple element valve-metal, solid-electrolyte, surface-mount capacitors are manufactured using one or more materials taken from the following three categories of materials: graphitic carbon, highly-conductive metal-powder-filled paint, and metallic terminals. The resulting capacitors have lower equivalent series resistance (ESR) at 100 kHz than do similar capacitors manufactured with conventional materials and with conventional techniques. Moreover, not only do these devices possess lower "as-manufactured" ESR, but also their ESR is substantially more stable (less increase in ESR) when these devices are exposed to IR reflow temperatures, high humidity, thermal shock, 1000 hours at 150° C., and 1000 hours at 175° C.

29 Claims, 2 Drawing Sheets

T: METALLIC TERMINAL RESISTANCE
I: INTERFACIAL RESISTANCE
A: CONDUCTIVE ADHESIVE RESISTANCE
P: METAL PAINT LAYER RESISTANCE
C: CARBON LAYER RESISTANCE
D: DIELECTRIC COATING RESISTANCE
L: DIELECTRIC LOSS AND INSULATION RESISTANCE
W: RISER WIRE AND WELD RESISTANCE

COMBINATIONS OF MATERIALS TO MINIMIZE ESR AND MAXIMIZE ESR STABILITY OF SURFACE MOUNT VALVE-METAL CAPACITORS AFTER EXPOSURE TO HEAT AND/OR HUMIDITY

FIELD OF THE INVENTION

The invention relates to combinations of materials (graphitic carbon, highly-conductive metal-powder-filled paint, and metallic terminals) and methods of using these materials to manufacture solid-electrolyte, surface mount valve-metal capacitors having exceptionally low ESR (equivalent series resistance) and high ESR stability after exposure to extreme heat and/or humidity.

BACKGROUND OF THE INVENTION

All electronic circuits contain capacitors. These devices store and dispense electrical charge in response to circuit currents, resulting in predictable increases and decreases of voltage across their terminals. It is this predictable and limited short-term variation of terminal voltage that makes capacitors useful as coupling and filtering devices in electronic circuits. Specifically, capacitors are useful in circuit locations where one does not want the voltage to change rapidly. One excellent use of capacitors is to minimize or "filter-out" both random and periodic fluctuations from the output stage of direct-current (DC) power supplies.

The ability of capacitors to perform their filtering function is limited by the unwanted "parasitic" resistances that result from the use of real-world, non-ideal materials in their construction. These parasitic resistances, collectively known as the finished capacitor's equivalent series resistance (ESR), manifest themselves in the user's electrical circuit as though they were a discrete resistor connected in series with the capacitance of the capacitor. Whereas ideal capacitor elements inherently oppose rapid voltage shifts in the face of changing current, the voltage across resistors changes instantaneously and proportionally to changing current. So if a practical capacitor has significant ESR, the resulting instantaneous voltage shifts across the capacitor's ESR, that are proportional to changes in circuit current, undermine the voltage-stabilizing influence of the capacitor. If the ESR becomes too large, the capacitor becomes useless as a filtering device.

Early electronic circuits designed with vacuum tubes typically employed high voltages and relatively low currents. This was a consequence of the high impedance (ratio of voltage to current) of these early electronic devices. Capacitors used in power supply filter applications typically filtered high voltages (>100 V), experienced low fluctuating currents (ripple current<1 A), and rarely experienced significant ripple current at frequencies greater than 120 hertz (cycles per second). Routine manufacturing methods and materials yielded filter capacitors with low enough ESR to easily satisfy the needs of these early electronic circuits.

Change has come to the world of electronics in several forms, one of which is change in the kinds of active devices employed in circuits. Vacuum tubes were replaced by discrete transistors and, now, discrete transistors have largely been displaced by integrated circuits. Even integrated circuits have evolved steadily. An example is microprocessors where the number of active devices (transistors) in a state-of-the-art microprocessor chip doubles every year or so. The most significant impact of this evolutionary change is that power supply voltages have fallen steadily (to limit power consumption in the circuits) and supply currents have risen (reflecting the greater number of active devices in integrated circuits and the higher frequencies at which these devices operate).

Since circuit voltages are now lower and currents higher, the ESR of capacitors has become of critical interest to the engineers who design these modern circuits. In contrast to the days when if a capacitor's capacitance were high enough to meet the circuits needs then it's ESR would almost certainly be low enough, today's circuits demand such low ESR that engineers frequently must use more capacitance than was formally required in order to obtain sufficiently low ESR for proper circuit operation. This leads to circuits that are physically larger and more expensive than is necessary. There is a distinct need for capacitor manufacturers to supply capacitors whose ESR is low enough to meet circuit requirements without the need to employ excessive capacitance (and occupy unnecessary circuit volume).

Another change in the world of electronics is the shift from point-to-point wiring to the use of printed circuits, and the subsequent shift from the use of leaded components on printed circuit boards to the use of surface-mounted components. These changes have provided marvelous improvements in circuit compactness and manufacturing productivity, but have had significant impact on the physical requirements of electronic components. In the case of point-to-point wiring, if a component were sensitive to soldering heat, a discrete heat-sink could be attached to the component's leadwire between the point of soldering and the body of the component to minimize component heating during the soldering process.

In the case of circuit boards used with leaded components, the leads were inserted through holes in the board and were subsequently soldered on the opposite side. This arrangement reduced the practicality of heat sinking during soldering. But at least the heat was applied on the side of the board opposite from that of the component, thus limiting component heating to that caused by heat conduction through the leadwires.

Today, almost all components are mounted to the surface of circuit boards by means of infra-red (IR) or convection heating of both the board and the components to temperatures sufficient to reflow the solder paste applied between copper pads on the circuit board and the solderable terminations of the surface mount technology (SMT) components. Not only is heat-sinking impractical in this case, it would actually defeat the effectiveness of the soldering method. A consequence of surface-mount technology is that each SMT component on the circuit board is exposed to soldering temperatures that commonly dwell above 180° C. for close to a minute, typically exceed 230° C., and often peak above 250° C. If the materials used in the construction of capacitors are vulnerable to such high temperatures, it is not unusual to see significant positive shifts in ESR which lead to negative shifts in circuit performance. SMT reflow soldering is a significant driving force behind the need for capacitors having temperature-stable ESR.

Another driving force behind the need to manufacture capacitors having temperature-stable ESR is high circuit temperatures. As circuits are miniaturized, it becomes more difficult to remove the heat that is generated by normal circuit operation. Thus, it is not unusual for capacitors to operate in high ambient temperature environments (up to 125° C.). Also, electronics are becoming an integral part of automotive applications, especially in under-the-hood applications. It is not unusual for the ambient environment to reach 150° C. in such applications with the desire to go to 175° C. and potentially higher. Another issue with automotive applications is temperature cycling and thermal shock. It is essential that ESR remain stable in the face of both high temperature and high rates of change of temperature.

A final threat faced by capacitors is humidity. Some high-reliability circuits are cleaned after the SMT mounting process to remove contaminants (flux residues and other contaminants). Freon-based solvents were used in the past with a high degree of cleaning effectiveness and minimal impact on component reliability. Today, with concern about the use of potentially ozone-depleting substances, many electronics manufacturers are using cleaning systems that are water-based.

Typical cleaning cycles can last for more than an hour and components can be exposed to significant heat and humidity which can cause moisture to permeate through the component's case, potentially saturating the device. Also, since much manufacturing is done in the "Pacific-Rim" countries, it is not unusual for components to be exposed to significant heat and humidity if they are stored for significant time in non-air-conditioned warehouses. Moisture can degrade ESR by attacking the integrity of electrical connections within the capacitor with a combination of oxidation and corrosion. It has become essential that capacitors resist unwanted positive shifts in ESR when they are exposed to high-humidity environments.

Production of low-ESR capacitors has proven to be a formidable challenge. Capacitors manufactured with traditional materials and methods have excessively high initial ESR. Moreover, after these capacitors are exposed to SMT reflow temperatures by the user, the ESR tends to shift upward still more. After reflow mounting, exposure to humidity, high operating temperatures, and/or thermal shock results in further, steady deterioration of ESR which can ultimately lead to the failure of the device to perform adequately in the circuit.

A particular capacitor that is desirably optimized for low ESR is a valve-metal, solid-electrolyte, surface-mount electrolytic capacitor. Such capacitors have as their dielectric thin, highly insulating anodic oxide film which may be produced electrolytically on the so-called valve metals (e.g. tantalum, aluminum, titanium, and niobium). The positive terminal of the finished capacitor is connected to the non-oxidized portion of the valve metal which supports the metal-oxide dielectric layer. The negative terminal is connected to the outermost layer of a succession of conductive layers which are formed on the exposed surface of the dielectric layer. A typical valve-metal capacitor comprises one or more metal-oxide capacitor elements which are connected electrically to metallic terminals and which are encapsulated in a protective plastic covering, coating, or case.

It is desirable to produce valve-metal, solid-electrolyte, surface mount electrolytic capacitors having low ESR. It is also desirable to produce capacitors that are substantially unaffected by heat from SMT reflow soldering, humidity exposure at elevated temperature, aggressive thermal shock conditions, and continuous operational exposure to high temperatures.

SUMMARY OF THE INVENTION

It is an objective of the invention to create a valve-metal, solid-electrolyte, surface mount electrolytic capacitor having exceptionally low equivalent series resistance (ESR).

Another objective of the invention is to create a valve-metal, solid-electrolyte, surface mount capacitor whose ESR is substantially stable after the cumulative environmental stress created by IR reflow soldering, humidity exposure at elevated temperature, thermal shock temperature cycling, and continuous operational exposure to various high temperatures (e.g. 1000 hours at 150° C. and 1000 hours at 175° C.).

Consistent with these objectives, the invention is directed to the combination of specific materials from three categories of materials used in the construction of valve-metal, solid-electrolyte, surface mount electrolytic capacitors. These three categories of materials are graphitic carbon, highly-conductive metal-powder-filled paint, and metallic terminals.

When the materials of the present invention are selected and applied as described, the result is a valve-metal, solid-electrolyte, surface mount electrolytic capacitor having extraordinarily low ESR and also having ESR that is substantially more stable than that of prior art devices when the capacitors are exposed to the cumulative environmental stress of multiple IR reflow profiles, intense humidity at high temperature, multiple thermal shock cycles, and/or continuous operational exposure to high temperatures.

The invention relates to the use of various combinations of (1) a high-purity, micro-graphited suspension of carbon particles for the carbon layer, having a thermally stable binder or a binder that decomposes to conducting species, (2) high metal content paint for the metal paint layer, and (3) high electrical conductivity metal alloy for the metallic terminal having selectively plated surfs to enhance interfacial conductivity and interfacial electrical stability between the lead frame, the metal paint, and the conductive, silver-filled adhesive (or similar material) that joins them.

The invention is directed to a valve metal capacitor comprising at least one anodized element having a dielectric layer formed on the element, a conductive layer formed on the dielectric layer, a graphitic carbon layer formed on the conductive layer, a metal-powder-filled paint layer formed on the graphitic carbon layer, and a negative metallic terminal attached to the paint layer. At least one of 1) the graphitic carbon layer is formed from graphitic carbon having at least 73% graphite carbon in a binder stable at temperatures of at least 150° C. or a binder that decomposes into conducting species when exposed to reflow temperatures; 2) the metal-powder-filled paint layer has a resistivity of less than about 0.0005 Ω·cm and comprises metal powder in a binder stable at temperatures of at least 200° C.; or 3) the negative metallic terminal has a conductivity of at least 90% the conductivity of pure copper, wherein at least the surface of the negative metallic terminal connected to the metal-powder-filled paint layer is plated with a protective coating to prevent oxidation of the negative metallic terminal, and wherein the protective coating is thermally stable at temperatures of at least 200° C.

The interaction of at least two of the materials of the invention provides unexpected improvement in ESR stability, more so than one would predict based on his knowledge of these material's impact on "as-manufactured" ESR when used alone. This synergistic effect among the materials was hitherto unknown and unanticipated by prior art practice.

DETAILED DESCRIPTION OF THE INVENTION

Figure 1:
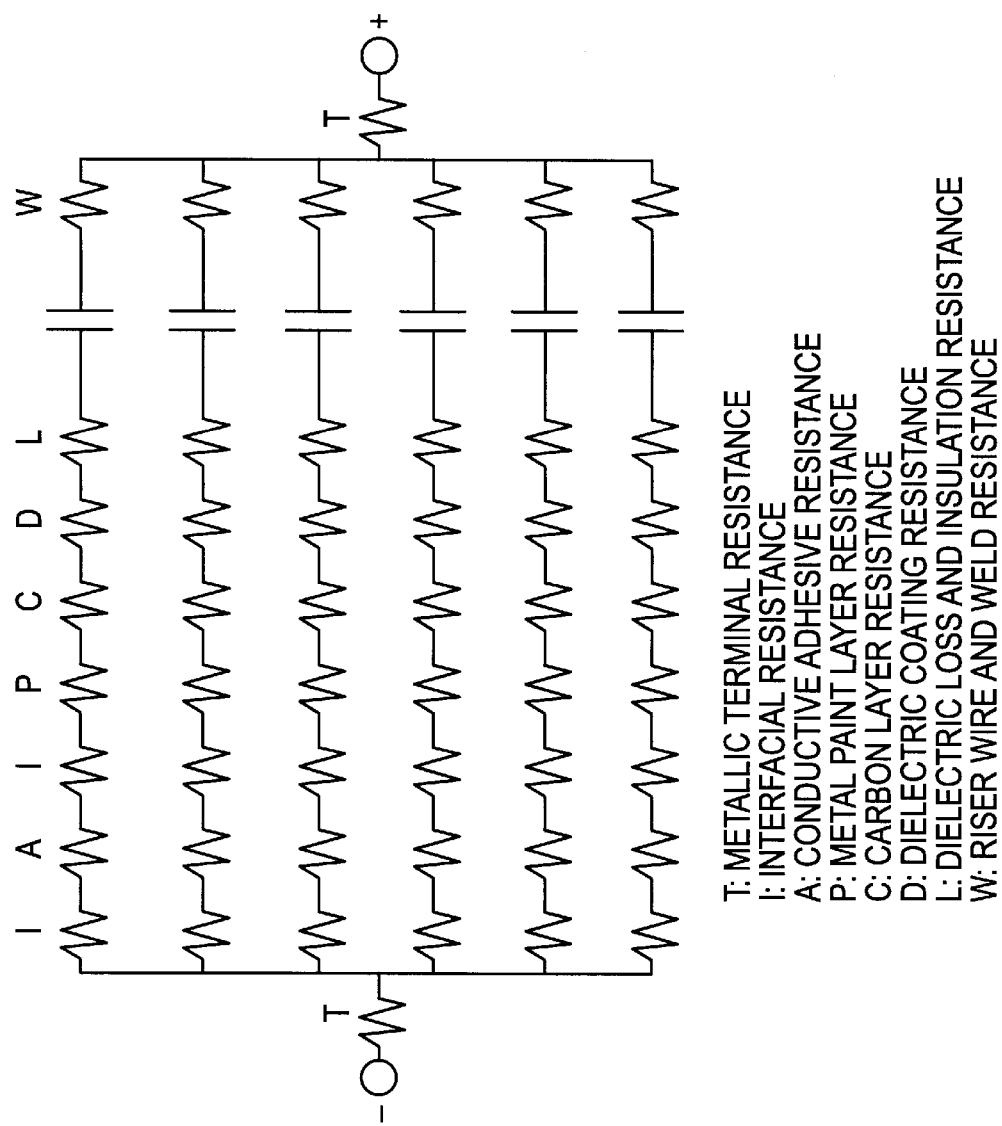
FIG. 1 is an electrical schematic diagram of the circuit model that describes the electrical impact on device ESR of the materials used in the manufacture of valve-metal, solid-electrolyte, surface mount capacitors that contain six (6) capacitor elements.

The present invention is particularly directed to the preparation of ultra-low ESR anodized valve metal, powder-metallurgy surface mount electrolytic capacitors, e.g. 1000 $\mu$F, 4V, $MnO_2$ capacitors with ESR no more than 10 m$\Omega$; 680 $\mu$F, 6V, $MnO_2$ capacitors with ESR no more than 12 m$\Omega$; and 470 $\mu$F, 10V, $MnO_2$ capacitors with ESR no more than 15 m$\Omega$. The valve metal may be any suitable valve metal including tantalum, aluminum, niobium, or titanium. A dielectric layer is formed on the valve metal.

A conductive layer is formed on the dielectric layer to provide the negative connection to the dielectric layer. The conductive layer is created by impregnating the anodized element with manganese dioxide, a conductive polymer, a meltable conductive salt, or other suitable means within the skill of the art.

The conductive layer is then covered with a layer of graphitic carbon and then with a layer of highly-conductive metal-powder-filled paint. The carbon layer acts as a buffer layer between the conductive layer covering the dielectric and the metal in the highly-conductive metal-powder-filled paint, minimizing chemically driven increases in interfacial resistance that occur in the absence of the carbon.

The metal paint covered portion of the capacitor element is then electrically connected to the negative metallic terminal of the finished capacitor by means of conductive, metal-filled epoxy adhesive or other similar means. Finally, the now fully-assembled device is encapsulated within a suitable container which has provisions for electrical connections between the capacitor element(s) and the external electrical circuit.

At least one, preferably two, and most preferably all three of the following stability-promoting materials are used in the preparation of the capacitor: 1) the graphitic carbon layer is formed from graphitic carbon having at least 73% graphite carbon in a binder stable at temperatures of at least 150° C. or a binder that decomposes into conducting species when exposed to reflow temperatures. 2) the metal-powder-filled paint layer has a resistivity of less than about 0.0005 $\Omega$·cm and comprises metal powder in a binder stable at temperatures of at least 200° C. 3) the negative metallic terminal has a conductivity of at least 90% the conductivity of pure copper, wherein at least the surface of the negative metallic terminal connected to the metal-powder-filled paint layer is plated with a protective coating to prevent oxidation of the negative metallic terminal, and wherein the protective coating is thermally stable at temperatures of at least 200° C.

The combinations of materials of the invention not only reduce ESR, but also stabilize ESR in the face of exposure to severe environmental stress more than could be predicted from the "as-manufactured" performance alone. After exposure to extreme environmental stress, the ESR of capacitors made with the inventive combinations of materials is lower than the ESR of capacitors made with conventional combinations of materials—by an amount greater than is seen before exposure to this environmental stress.

Another way to lower the ESR of such capacitors is to alter their internal structure so that electrical path lengths are minimized and the effective surface area of the capacitor element(s) inside is maximized. Piper (3,686,535) discovered that subdividing one large capacitor element into several smaller elements, and connecting these smaller elements electrically in parallel yields capacitors that have lower impedance and, thus, lower ESR when they are compared to capacitors made with one large capacitor element of similar capacitance and rated voltage.

A preferred embodiment thereof combines the inventive combinations with Piper's multi-element design to achieve capacitors with extraordinarily low ESR. The invention works well with both single-element, valve-metal, solid-electrolyte, surface mount capacitor designs, and multi-element capacitors with at least two, preferably at least four capacitor elements per device.

An electrical schematic diagram of a six-element, valve-metal, solid-electrolyte, surface mount capacitor appears in FIG. 1. The diagram identifies discrete resistances that result from the materials used to construct the individual capacitor elements, the resistances involved in the electrically-parallel interconnection of the elements, and the resistances of the metallic terminals that are used to connect the parallel elements to an external circuit. The resistances that are pertinent to the invention are identified as "C: Carbon Layer Resistance," "P: Silver Paint Layer Resistance," "I: Interfacial Resistance," and "T: Metallic Terminal Resistance."

The Graphitic Carbon Layer

The graphitic carbon layer may be prepared by dipping a capacitor element into a suspension of highly graphitized carbon particles and binder, and then drying/curing the carbon layer that remains on the surface of the element after the element is withdrawn from the suspension. Prior to curing, the layer should be sufficiently dried to substantially remove solvents or water that might volatilize and thereby generate localized pressure gradients which can cause delaminations or other physical or electrical disruptions of the finished carbon layer.

The high degree of graphitization enhances the bulk conductivity. A high degree of graphitization means at least 73%, preferably at least 75% graphitic carbon (versus amorphous carbon). Preferably, the percent solids of the suspension of graphitized carbon particles is maintained between about 2% and about 15%, preferably between about 5% and about 100%, by weight.

The pH is generally between 8 and 11, preferably between about 9 and about 10 to maintain chemical stability. The pH may be adjusted by the addition of an appropriate base such as ammonia or a volatile amine. The graphitized suspension may also be stabilized and purified by circulation in a dipping tank, filtering to remove clumps of carbon, high-shear mixing, and/or ultrasonic treatment to re-suspend clumps.

The carbon layer is applied (including the drying and/or curing process) so that there is intimate electrical contact between the carbon layer and the two adjacent layers that the carbon layer separates. This intimate contact achieves enhanced interfacial conductivity from each layer to the next. The degree of graphitization also improves the conductivity of the interfacial junction. The highly graphitized carbon suspension must be stable to avoid clumping which leads to non-uniform coverage and poor contact.

The binder material in which the deposited graphitic carbon is suspended must be either a material which is stable when exposed to elevated temperatures (above about 150° C.), or a material that decomposes to conductive, carbonaceous byproducts rather than low-conductivity organic compounds after exposure to such elevated temperatures. Suitable binder materials include starch, solubilized cellulose, and organic materials that give rise to carbon instead of boiling away.

The thickness of the carbon layer is preferably about 0.0001 inches to about 0.003 inches, more preferably about 0.0005 inches to about 0.002 inches. The carbon layer must be thin not only to reduce the resulting series resistance, but also to enhance the mechanical strength of the carbon layer. The bulk strength of graphitic carbon is not inherently high. However, since thin layers conform better to the irregular surfaces present in valve-metal, solid-electrolyte capacitors, they allow for subsequent stronger layers of materials (e.g. thermo-set epoxy based silver paint) to take on the same irregular surface shape, thus interlocking with the irregular surface and boosting the effective strength of the carbon layer.

Thicker layers of graphitic carbon cause higher ESR because resistance is proportional to the layer's thickness and also cause unstable ESR because thick layers have less mechanical strength than thin layers, as discussed above. Reduced mechanical strength can lead to mechanical separations in the carbon layer after finished capacitors are exposed to environmental stress, causing higher ESR. Thicker carbon layers are also more difficult to dry/cure. If the drying/curing process is inadequate, subsequent application of high heat can cause trapped solvents or moisture to evaporate and generate high localized pressure. This pressure can damage the integrity of the carbon layer, thus raising the ESR of the finished capacitor. The drying/curing process is carried out so as to facilitate the evaporation of the solvent without boiling, typically by air drying prior to oven drying/curing.

However, the layer of graphitic carbon must be thick enough to provide a chemical buffer between the two materials it separates. Also, since thin layers of graphitic carbon result from dipping into very dilute suspensions which aggressively wick into porous structures, it is possible for the carbon to migrate deep into the structure. The graphitic carbon should effectively coat the surface of the material, not permeate it.

A suitable micro-graphited carbon suspension is DAG1050, manufactured by Acheson Colloids Company.

The Metal-Powder-Filled Paint Layer

The carbon coated capacitor element is then dipped into a highly conductive metal-powder-filled paint. The highly-conductive metal-powder-filled paint preferably has an organic content which comprises thermally stable cross-linked thermoset epoxy or polyimide with low post-cure ionic content. Highly conductive means bulk resistivity less than about 0.0005 $\Omega \cdot$cm. Thermally stable means that the binder is stable at a temperature of at least 200° C. and preferably between 200° C. and 300° C. for periods longer than 10 minutes. Also, the metal-powder-filled paint is indefinitely stable to decomposition at 150° C., preferably at least 175° C. (for at least 1000 hours). A low post-cure ionic content means 100 ppm or lower ionic material based on weight of dried paint.

The conductive metal paint layer may be applied by dipping the capacitor element into a pool of paint, widrawing it at a controlled rate, and drying/curing the layer so produced. Suitable metal powders include silver, gold, nickel, or copper. Preferably the metal powder is silver. The powder may be in any suitable form such as particles or flakes.

The metal powders are in a suitable thermally stable binder such as thermosetting epoxy, thermosetting polyimide, silicone epoxy or phenolic resins. The binder may be thinned with a suitable solvent such as propylene glycol mono methyl ether acetate (PMA), butyl acetate (BA), dipropylene glycol mono methyl ether (DMM), and dimethyl esters of succinic, glutaric, and/or adipic acids sold by DuPont under the trade name DBE.

The metal paint layer provides an intimate, low-resistance connection to the graphitic carbon and provides a highly conductive surface which can subsequently be bonded to the negative terminal (or leadwire) of the finished capacitor by means of conductive silver adhesive, solder, or similar material. The metal paint also provides an approximately equipotential (electronically) surface that effectively captures electrical displacement currents generated within the capacitor so that they can be guided to the negative terminal with a minimum of unnecessary electrical resistance. Thus, it is critical that the metal paint layer have low bulk resistivity after drying/curing and be applied over as much of the surface of the capacitor element as is practical. Low bulk resistivity means less than about 0.0005 $\Omega \cdot$cm.

The metal paint layer is preferably dried prior to curing to avoid generation of localized pressure in the metal paint coat, thus leading to ruptures, delaminations, or other physical disruptions that raise capacitor ESR.

After drying/cuing, the paint preferably has at least about 80% metal solids by weight based on total weight of the paint, more preferably greater than about 85% and most preferably greater than about 90%, in order to achieve acceptable conductivity. The metal flake used in the paint must have appropriate surface morphology to insure adequate flake-to-flake contact, flake-to-flake contact, and exposure of surface flake edges after the paint has dried/cured. These favorable silver paint properties are also influenced by the shrink rate of the binder material.

Lubricants used during the milling of the flake must be chosen to be compatible with the binder materials of the paint to maximize electrical conductivity after drying/curing. Finally, the paint's viscosity is preferably controlled by the addition of a suitable solvent/thinner in order to optimize the thickness and uniformity of the resulting coat.

The binder of the metal paint must not interfere with the electrical conductivity of the dried/cured paint or its electrical stability when exposed to environmental stress. The binder must be thermally stable so as to not deteriorate upon exposure to solder reflow temperatures which can exceed 250° C. This stability can be achieved either by employing only materials stable at reflow temperatures or by insuring that any non-thermally stable materials are decomposed and removed during the curing/drying process while the resulting controlled shrinkage brings the silver flakes into mutual contact. The highly-conductive metal-powder-paint should withstand IR reflow temperatures (typically between 175° C. and 260° C.) for brief periods (less than 3 hours) or somewhat lower temperatures (typically between 125° C. and 175° C.) for extended periods (up to 1000 hours, or more) without substantial increase in the ESR of the capacitor. Materials that can successfully survive solder reflow temperatures include, but are not limited to, thermosetting cross-linked epoxy resins, phenolic resins, and/or polyimides.

The metal paint should be electrically stable when exposed to high humidity. Thus, the ionic content of the binder is minimized to prevent corrosion of the metal flake in the presence of humidity. That is, the paint is substantially free from mobile ionic species. Also, the binder should adequately coat the metal flakes, resist absorption of moisture, and be mechanically stable in the presence of moisture (not swell).

A suitable metal paint is DP5262, a silver paint manufactured by duPont. Preferably the silver paint contains more than 80% silver content by weight after curing and is thinned with either propylene glycol mono methyl ether acetate, butyl acetate, dipropylene glycol mono methyl ether, or one or more dibasic esters sold by duPont under the brandname of "DBE." The silver paint provides a suitable low-resistance, equipotential silver coat that can be joined effectively to the capacitor's negative terminal and demonstrates the desired electrical and mechanical stability when exposed to IR reflow temperatures and/or high humidity.

The metal paint preferably covers between 50% and 95% of the external surface area of the capacitor element so as to maximize the equipotential conductive surface that collects the displacement currents generated while charging and discharging the capacitor element.

The Metallic Terminals

The metallic terminals contain any suitable metal such as copper, silver, or an alloy having at least 90% conductivity of pure copper such as Alloy 194. Such alloys may be "half-hard," "hard," "extra-hard," "spring-hard," or "extra-spring-hard."

The metallic terminals are preferably predominantly copper which is selectively plated to minimize heat- and humidity-driven increases in resistance caused by oxidation, corrosion, and/or growth of intermetallic species.

The metallic terminals are preferably a thin sheet of electrically conductive metal that is either punched or etched to obtain a pattern of conductive metallic regions to which the positive and negative terminals of the capacitor element (s) are either welded, soldered, or attached by means of conductive silver adhesive, for example. After this assembly process, the multiple assembled capacitors can be handled in mass on the lead frame to simplify the process of conformal coating, to facilitate automated processing during almost all assembly steps, and electrical test and measurement. Then each finished capacitor is separated from its neighbors on the lead frame and the remaining, protruding strips of lead frame metal are folded around the leading and trailing edges of the finished capacitors in order to provide easily solderable positive and negative terminals for the finished capacitors.

Alternatively, metallic terminals can be formed into the shape of endcaps which cover the positive and negative ends of one or more capacitor elements that have been conformally coated with an electrically insulating encapsulant leaving a portion of each metal paint coated capacitor element's body uncovered, via masking, to provide electrical connection to the negative metallic terminal. Such methods are well known to those skilled in the art and include fluidized bed and liquid immersion. The negative metallic terminal (cathode) connection is achieved by attaching, by means of conductive metal-filled adhesive, the single negative end cap to the exposed portion of the metal paint which coats the negative terminal(s) of the capacitor element(s). The positive metallic terminal (anode) connection is achieved by welding the positive single end cap to the riser wire(s) of the capacitor element(s).

Suitable adhesives include silver-filled conductive adhesives, gold-filled conductive adhesives, and nickel-filled conductive adhesives.

To form the ultra low-ESR capacitors, the alloy from which the metallic terminal is constructed must have low electrical resistivity (at least 90% of the conductivity of copper). The terminal metal must also present an easily soldered surface during the customer's IR reflow mounting process. There must be successful solderability after exposure to heat and humidity which tend to oxidize and/or corrode metallic surfaces. The solderability characteristic is usually provided by solder-plating the metallic terminal. Occasionally, capacitors are mounted to circuits by means of conductive, metal-filled epoxy. In this case, the external surface of the metallic terminal must also be protected from oxidation and/or corrosion, but the protective coating is usually not solder. The terminal metal must generally be soft enough to allow bending of the positive and negative terminals into position or forming end caps without generating stress fractures, but also be tough enough to maintain its physical shape during the various manufacturing steps.

Generally, valve-metal, solid-electrolyte, electrolytic capacitor elements are connected to the positive metallic terminal by resistance welding. That is, the positive terminal of the capacitor element is pressed against the terminal metal by pressure exerted by a pair of conductive electrodes. A sort burst of current is directed through the various metals and enough heat is generated in the terminal metal and positive terminal of the capacitor element to cause them to weld together (fuse), with minimal fusing to the electrodes of the welder. High electrical conductivity in the metallic terminal does not usually provide successful resistance welding because it is difficult to isolate the resulting heat to only the welded junction, a situation which frequently results in either melting of the welding electrodes, sticking between the metallic terminal and an electrode, sticking between the positive terminal of the capacitor element and an electrode, or all three. These problems generally result in poor weld strength and/or weld reliability. For this reason, most conventional metallic terminal alloys do not possess superior electrical conductivity, many having ten times (or more) the electrical resistivity of superior alloys. Thus, electrical conductivity is frequently traded off to achieve acceptable weld strength. However, electrode metals and welding schedules may be chosen that are compatible with high-conductivity metallic terminal alloys. Also, these connections can be made by laser welding or ultrasonic joining techniques.

The interface between the metallic terminal and the joining material (silver-filled adhesive, solder, etc.) used to connect the metal paint (negative terminal) of the capacitor element to the metallic terminal must be electrically stable not only during the manufacturing process, but also during exposure to environmental stress. If the metallic terminal's surface is prone to oxidation or corrosion, it may be difficult to create an acceptable electrical connection during the manufacturing process, but it will almost certainly be difficult to maintain a stable electrical connection during exposure to environmental stress.

One common solution is to coat the entire metallic terminal with the same solder plating that is employed to keep the terminals of the finished capacitor solderable. There are difficulties with this approach. One difficulty is that the solder plating tends to melt during exposure to IR reflow conditions, and the molten solder can be forced outside of the encapsulating material. Another problem with solder plating is that intermetallic species can form under the solder coating. During IR reflow, the solder melts, but then is unable to wet to the intermetallic species upon which it rests. Upon resolidification, the solder no longer makes adequate electrical connection between the joining material discussed above and the base-metal of the metallic terminal. Another problem is that the molten solder can scavenge the silver from conductive silver adhesive by dissolving it. These problems cause the electrical resistance of the junction to rise after IR reflow exposure, which raises the ESR of the capacitor.

A better solution than solder plating the region of the lead frame that will be joined to the negative terminal of the capacitor element is to selectively coat this surface with a protective, conductive coating that cannot melt at reflow temperatures and is not likely to oxidize or corrode. Suitable coatings include palladium, platinum, and gold. Thus, the metallic terminal has a protective coating on at least the surface connected to the metal-powder-filled paint layer. The protective coating may also be plated on the surface external to a protective conformal case of the finished capacitor. The protective coating may cover the entire surface of the metallic terminal. The protective coatings promote low-resistance connections to the capacitor element(s) and to the external circuit.

A suitable metallic terminal is fabricated from alloy 194, which is an alloy made predominantly from copper, giving it much higher electrical conductivity than other, more conventionally used alloys. The alloy 194 terminal metal is either selectively plated with palladium (or gold) only in the region to be joined to the negative terminal of the capacitor element, or palladium (or gold) plated overall. The terminal metal is then selectively solder plated, but generally only in the regions that will be exterior to the protective case of the finished capacitor. The positive terminal(s) of the capacitor element(s) are resistance welded to the alloy 194 lead frame. Successful welding occurs because the welding electrodes are chosen to be a high-melting-point material which has acceptable conductivity, optimal welding parameters are employed, and the weld is generated at the optimal location on the lead frame metal. An example of a conventional metallic terminal is one fabricated from solder-plated alloy 752 which has approximately ten times the electrical resistivity of alloy 194, but which can be reliably welded using conventional electrodes and welding schedules.

Preferably the electrodes of the resistance welder are made from a high-melting point material (e.g., anviloy) that does not readily stick to either the metallic terminal or the positive terminal(s) of the capacitor element(s) during the welding schedule. Further the welding schedule is modified to increase the current during welding, but shorten the welding time versus welding schedules commonly used with more conventional metallic leadframe alloys. This modified welding schedule improves weld integrity by accommodating the high-conductivity leadframe metal's tendency to rapidly heat sink and dissipate welding heat by generating this heat in a shorter time frame before it can be dissipated. Preferably the weld(s) is/are formed at the extreme edge of the leadframe to further limit the loss of welding heat during the weld schedule due to the high thermal conductivity of metals that have high electrical conductivity.

EXAMPLES

Example 1

Figure 2:
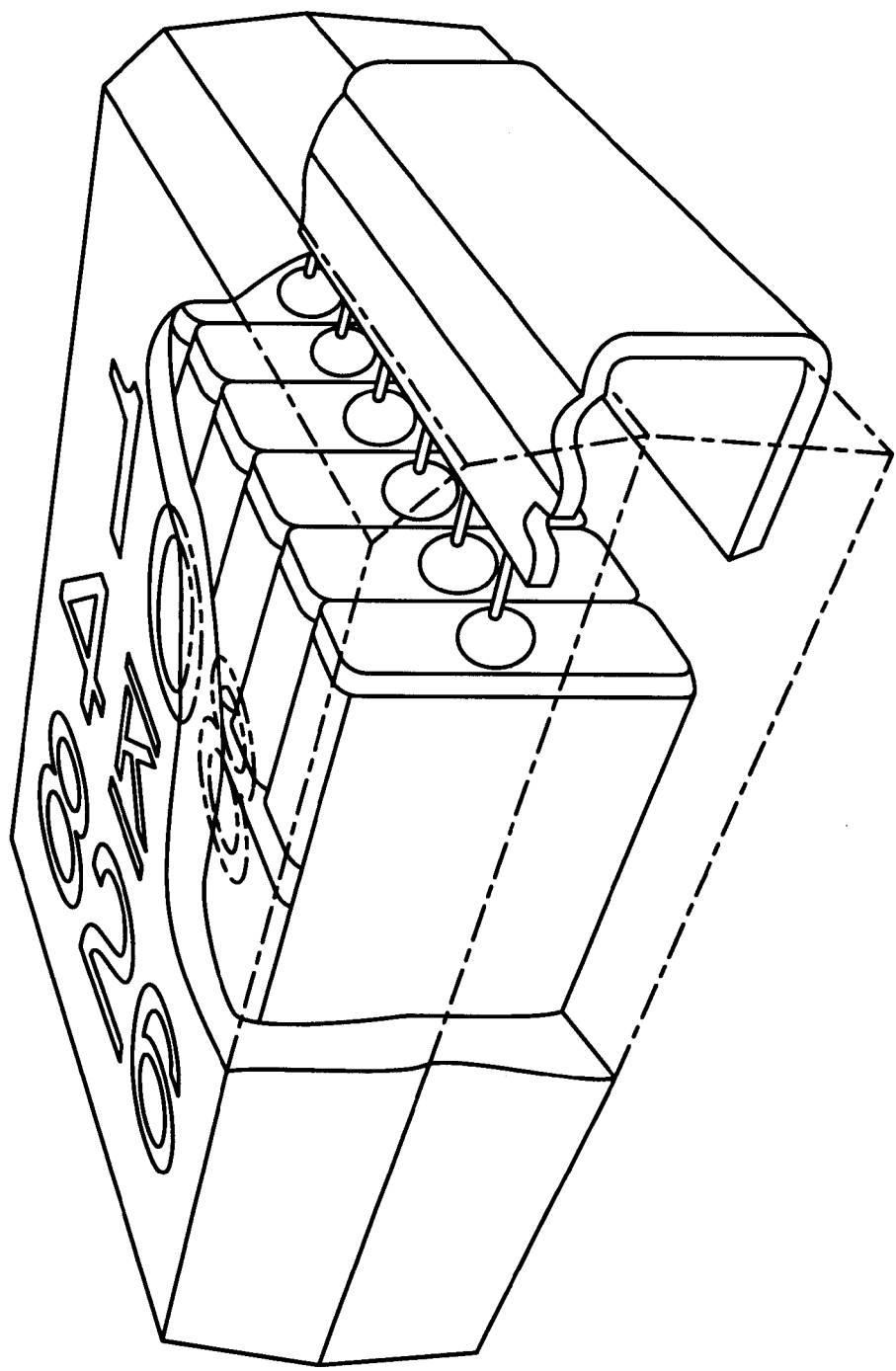
FIG. 2 is an example of a multi-element capacitor that behaves according to the electrical diagram of FIG. 1.

Multi-element $MnO_2$-impregnated, tantalum-oxide, surface mount capacitors were fabricated similar to those described by Piper (U.S. Pat. No. 3,686,535, see FIG. 1). Six identical tantalum capacitor elements were fabricated in accordance with the invention and connected electrically in parallel as shown in FIG. 2. The median ESR performance of these capacitors demonstrates the efficacy of the capacitors of the invention. The capacitor elements were connected to the external circuit by means of thin metallic strips (originally part of a larger lead frame structure) to which the positive terminals of the capacitor elements were welded and to which the negative terminals of the capacitor elements were electrically connected by means of conductive silver adhesive.

Individual tantalum capacitor elements were fabricated by pressing tantalum flake or powder into a compacted rectangular slug at 25% to 75% theoretical density. A tantalum wire exited one narrow surface of the slug (or was welded to the surface of the slug) and ultimately became the positive terminal of the capacitor element. This slug was sintered at high temperature to fuse the individual tantalum particles together while maintaining maximum practical porosity and internal surface area.

Tantalum oxide was grown electrolytically on the surface of the porous tantalum slug and resulted in partial consumption of the underlying tantalum metal. The tantalum oxide behaves as the dielectric of the finished capacitor. Electrical connections were made to the exposed surface of the dielectric before the capacitor element could be electrically connected to an external circuit.

The electrical connection to the exposed surface of the dielectric was fabricated in layers, and the layers were applied in a specific order so that only compatible materials were in contact with each other, specifically, placed in order on the tantalum-oxide dielectric were manganese dioxide ($MnO_2$) or conductive polymer, graphitic carbon, and metal paint. The metal paint was the external surface and negative terminal of the finished capacitor element and was then attached to the negative terminal of the finished, 6-element capacitor by means of conductive, metal-filled epoxy adhesive.

Capacitors were constructed per the method described above using eight different combinations of materials. The materials included graphitic carbon, silver paint, and metallic terminals within and outside the scope of the invention. Groups of capacitors, representative of each of the eight material combinations, were measured to determine the median ESR of that combination of materials. Then the devices were exposed to various cumulative environmental stresses with measurements made after each stress.

Trials to Establish the Efficacy of the Various Combinations

The materials within the scope of the invention were compared to conventional materials. All eight possible combinations of materials were tested to identify unexpected interactions among the various materials. The results are presented as the median ESR value per experimental group. The median ESR value is the ESR value that is both higher than that of half the group's members and lower than that of the other half of the group's population.

The performance of each test group was evaluated (measured) "as-manufactured" and after several cumulative exposures to severe environmental stress. The environmental stresses were 3 passes through a standard IR reflow process with peak temperature of 235° C., 134 hours of exposure to 85% relative humidity at 121° C. (called "HAST" testing), 500 cycles of thermal shock between −55° C. and +125° C., 1000 hours of life test exposure at 150° C. biased with 0.5 times rated voltage, and 1000 hours of life test exposure at 175° C. biased with 0.5 times rated voltage. Each of these stresses exceeded the normally expected environmental exposure during a capacitor's life, but the severity of the exposures helps to highlight the strengths and weaknesses of various material combinations.

Table 1 contains median ESR values in units of milliohms. For each of the three kinds of material (carbon, metal paint, and metallic terminals), one material is conventional while the other material is within the scope of the invention.

Data is provided for the devices "as-manufactured" and after each of the cumulative environmental stresses.

TABLE 1

ESR (mΩ)

| | Alloy | 2001 M, JM-P5900 | 2001 M, DAG 1050 | DP5262, JM-P5900 | DP5262, DAG 1050 |
|---|---|---|---|---|---|
| As Mfg | 752 | 10.4 | 10.0 | 9.2 | 8.7 |
| As Mfg | 194 | 7.7 | 7.5 | 6.8 | 6.6 |
| Post 3 IR Reflows | 752 | 12.8 | 13.3 | 9.9 | 8.8 |
| Post 3 IR Reflows | 194 | 11.6 | 9.4 | 6.9 | 6.4 |
| Post 134 hr unbiased HAST | 752 | 18.4 | 20.0 | 12.0 | 9.0 |
| Post 134 hr unbiased HAST | 194 | 16.1 | 12.8 | 9.0 | 6.7 |
| Post 500 Cycles Thermal Shock | 752 | 16.1 | 15.3 | 11.9 | 9.6 |
| Post 500 Cycles Thermal Shock | 194 | 13.0 | 10.3 | 8.7 | 6.9 |
| Post 1000 hr, 150C Life | 752 | 15.4 | 14.2 | 11.4 | 10.3 |
| Post 1000 hr, 150C Life | 194 | 11.6 | 9.2 | 8.0 | 7.0 |
| Post 1000 hr, 175C Life | 752 | 40.6 | 14.6 | 33.6 | 12.1 |
| Post 1000 hr, 175C Life | 194 | 36.8 | 9.9 | 26.7 | 8.2 |

Table 2 contains ESR-difference data which show the relative benefit of the graphitic carbon within the scope of the invention versus conventional graphitic carbon, not only "as-manufactured," but also after each of the cumulative environmental shifts. Positive numbers indicate that the inventive graphitic carbon indeed produced superior performance; negative numbers indicate that the inventive material produced inferior results. The right-most column of data contains the average improvement generated in all of the test cells by choosing the inventive graphitic carbon. This column provides two kinds of information: (1) the "as-manufactured" advantage of using the inventive micrographited carbon suspension, and (2) which type of environmental stress truly highlights the superiority of the inventive micrographited carbon suspension.

TABLE 2

Difference in 100 kHz ESR (mΩ) due to JM-P5900 vs. DAG 1050 Carbon

| Silver Paint: Leadframe: | 2001M Alloy 752 | 2001M Alloy 194 | DP5262 Alloy 752 | DP5262 Alloy 194 | Avg Shift due to C |
|---|---|---|---|---|---|
| As Mfg | 0.4 | 0.2 | 0.5 | 0.2 | 0.3 |
| post 3 IR reflows | −0.5 | 2.2 | 1.1 | 0.5 | 0.8 |
| post 134 hr unbiased HAST | −1.6 | 3.3 | 3.0 | 2.3 | 1.8 |
| post 500 Cycles Thermal Shock | 0.8 | 2.7 | 2.3 | 1.8 | 1.9 |
| post 1000 hr 150C Life | 1.2 | 2.4 | 1.1 | 1.0 | 1.4 |
| post 1000 hr 175C Life | 24.0 | 26.9 | 21.5 | 18.5 | 22.7 |

Table 3 contains ESR-difference data which show the relative benefit of the silver paint within the scope of the invention versus conventional silver paint, not only "as-manufactured," but also after each of the cumulative environmental shifts. Positive numbers indicate that the inventive silver paint indeed produced superior performance; negative numbers indicate that the inventive material produced inferior results. The right-most column of data contains the average improvement generated in all of the test cells by choosing the superior silver paint. This column provides two kinds of information: (1) the "as-manufactured" advantage of using the inventive metal paint, and (2) which type of environmental stress truly highlights the superiority of the inventive metal paint.

TABLE 3

Difference in 100 kHz ESR (mΩ) due to 2001M vs. DP5262 Silver Paint

| Carbon: Leadframe: | JM-P5900 Alloy 752 | JM-P5900 Alloy 194 | DAG1050 Alloy 752 | DAG1050 Alloy 194 | Avg Shift due to Ag |
|---|---|---|---|---|---|
| As Mfg | 1.2 | 0.9 | 1.3 | 0.9 | 1.1 |
| post 3 IR reflows | 2.9 | 4.7 | 4.5 | 3.0 | 3.8 |
| post 134 hr unbiased HAST | 6.4 | 7.1 | 11.0 | 6.1 | 7.7 |
| post 500 Cycles Thermal Shock | 4.2 | 4.3 | 5.7 | 3.4 | 4.4 |
| post 1000 hr 150C Life | 4.0 | 3.6 | 3.9 | 2.2 | 3.4 |
| post 1000 hr 175C Life | 7.0 | 10.1 | 2.5 | 1.7 | 5.3 |

Table 4 contains ESR-difference data which show the relative benefit of the metallic lead frame within the scope of the invention versus a conventional metallic lead frame, not only "as-manufactured," but also after each of the cumulative environmental shifts. Positive numbers indicate that the inventive material indeed produced superior performance; negative numbers indicate that the inventive material produced inferior results. The right-most column of data contains the average improvement generated in all of the test cells by choosing the inventive metallic lead frame. This column provides two kinds of information: (1) the "as-manufactured" advantage of using the inventive metallic terminal alloy, and (2) which type of environmental stress truly highlights the superiority of the inventive metallic terminal alloy.

TABLE 4

Difference in 100 kHz ESR (mΩ) due to Alloy 752 vs. Alloy 194 Leadframe

| Carbon: Silver Paint: | JM-P5900 2001M | JM-P5900 DP5262 | DAG1050 2001M | DAG1050 DP5262 | Avg Shift due to leadframe |
|---|---|---|---|---|---|
| As Mfg | 2.7 | 2.4 | 2.5 | 2.1 | 2.4 |
| post 3 IR reflows | 1.2 | 3.0 | 3.9 | 2.4 | 2.6 |
| post 134 hr unbiased HAST | 2.3 | 3.0 | 7.2 | 2.3 | 3.7 |
| post 500 Cycles Thermal Shock | 3.1 | 3.2 | 8.0 | 2.7 | 4.3 |
| post 1000 hr 150C Life | 3.8 | 3.4 | 5.0 | 3.3 | 3.9 |
| post 1000 hr 175C Life | 3.8 | 6.9 | 4.7 | 3.9 | 4.8 |

Analysis of Experimental Test Data

The "as-manufactured" section of Table 1 demonstrates that the combination of all inventive materials does indeed, produce superior results. That is, the combination of DAG1050 graphitic carbon, DP5262 silver paint, and selectively plated alloy 194 metallic lead frame (second line of far-right column in the "as-manufactured" section) produced the lowest median ESR (6.6 mΩ) of any of the competing combinations. However many of the other combinations of inventive and conventional materials produced very low ESR.

Table 1 also contains median ESR data for each competing combination of materials after the devices are cumulatively exposed to a variety of environmental stresses. Review of the data in the post-environmental stress sections of Table 1 reveals that the combination of inventive materials continues to have the best performance after each cumulative environmental stress. The superiority of the invention is the most pronounced after 134 hours of HAST humidity testing and after 1000 hours at 175° C. However many of the other combinations of inventive and conventional materials produced substantially stable ESR in the face of severe environmental stress.

Finally, after each cumulative exposure to environmental stress, the ESR of capacitors manufactured with the combination of only inventive materials (the optimal combination of the present invention) remains substantially stable while significant (and, sometimes, dramatic) ESR increases are observed for many of the other combinations of materials. The performance gap between the combination of all inventive materials and the other combinations grew as the devices received additional environmental stress.

At the end of testing, the spread of performance among the combinations of material had widened by an amount that was unanticipated, and could not have easily been predicted based on the "as-manufactured" performance of the combination of inventive materials. This points to a synergistic response among the inventive materials when they are used in combination and are then exposed to severe environmental stress. However, several of the combinations of inventive and conventional materials also produced ESR stability that can only be explained by synergism among the inventive materials.

In Tables 2 through 4, the benefit of each kind of superior material is analyzed, one material per table. The impact of the superior graphitic carbon is revealed in Table 2, the impact of the superior silver paint is revealed in Table 3, and the impact of the superior metallic lead frame is revealed in Table 4.

In the "as-manufactured" row of Table 2, the overall benefit derived from using the inventive graphitic carbon (DAG1050) with all combinations of silver paint and metallic lead frame is a 0.3 mΩ reduction in ESR. The overall benefit of the inventive graphitic carbon becomes more pronounced after cumulative environmental stress, where the most significant results are seen after 1000 hours at 175° C. This indicates that the greatest contribution provided by the inventive graphitic carbon is stability after lengthy exposure to very high temperatures. After 1000 hours at 175° C., the smallest overall shit occurs in the table column that contains data for the combination of the inventive silver paint (DP5262) and the inventive metallic lead frame (Alloy 194), demonstrating the synergistic effect of these two superior materials when exposed to elevated temperatures for long periods.

Interestingly enough, using the inventive graphitic carbon (instead of the conventional JM graphitic carbon) along with the combination of conventional silver paint (2001M) and conventional lead frame (Alloy 752) actually results in a small deterioration of ESR performance after IR reflow and HAST exposure. Thus the results obtained with all three inventive materials in combination was not expected.

In the "as-manufactured" row of Table 3, the overall benefit derived from using the inventive silver paint (DP5262) with all combinations of graphitic carbon and metallic lead frame is a 1.1 mΩ reduction in ESR. The overall benefit of the inventive silver paint becomes more pronounced after cumulative environmental stress, where the most significant results are seen after 134 hours of HAST testing. This indicates that the greatest contribution provided by the inventive silver paint is stability after exposure to intense moisture. The inventive silver paint also makes a significant contribution to ESR stability after 1000 hours at 175° C. After both 134 hours of HAST testing and 1000 hours at 175° C., the smallest overall shifts occur in the table column that contains data for the combination of the inventive graphitic carbon (DAG1050) and the inventive metallic lead frame (Alloy 194), demonstrating the synergistic effect of these two inventive materials when exposed to intense moisture and elevated temperatures for extended periods.

In the "as-manufactured" row of Table 4, the overall benefit derived from using the inventive metallic lead frame (Alloy 194) with all combinations of graphitic carbon and silver paint is a 2.4 mΩ reduction in ESR. The overall benefit of the inventive metallic lead frame becomes more pronounced after cumulative environmental stress, where the most significant results are seen after 500 cycles of thermal shock and after 1000 hours at 175° C. This indicates that the greatest contribution provided by the inventive metallic lead frame is stability after rapid temperature changes and stability after lengthy exposure to very high temperatures. After thermal shock and 1000 hours at 175° C., the smallest overall shifts occur in the table column that contains data for the combination of the inventive graphitic carbon (DAG1050) and the inventive silver paint (DP5262), demonstrating the synergistic effect of these two superior materials when exposed to thermal shock and elevated temperatures for long periods.

Overall, the experimental data demonstrate that the best (lowest) ESR performance is achieved when all three inventive materials (and associated methods) are used in combination (the optimal combination of the invention). Also, the data demonstrate that the capacitors manufactured from the inventive materials are remarkably more stable than capacitors manufactured from more conventional materials when the capacitors are exposed to severe environmental stress. This unexpectedly better stability demonstrates a synergistic relation among the superior materials when they are used in combination and are then exposed to environmental stress.

Detailed analysis of the data, material by material, not only demonstrates the benefit of each inventive material in capacitors "as-manufactured," but also demonstrates how this benefit is magnified by exposure to severe environmental stress. These detailed analyses provide insight into which inventive material provides significant robustness to one or more specific environmental stresses, and also demonstrate lower-level synergies among the inventive materials when these materials are taken two at a time.

The degree of ESR stability observed in capacitors constructed from all three of the inventive materials was wholly unanticipated and could not have been predicted based on the "as-manufactured" ESR performance observed for this combination of materials. This unanticipated stability demonstrates a synergy among the inventive materials that was hitherto unknown and could not be predicted. The lowest and most stable ESR is obtained when all three of the inventive materials are used simultaneously. However, measurable improvements in ESR and ESR stability can be obtained by using the inventive materials either two at a time or one at a time, in combination with conventional materials and methods.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A valve metal capacitor comprising at least one anodized element having a dielectric layer formed on the element, a conductive layer formed on the dielectric layer, a graphitic carbon layer formed on the conductive layer, a metal-powder-filled paint layer formed on the graphitic carbon layer, and a negative metallic terminal attached to the paint layer; wherein at least one of 1) the graphitic carbon layer is formed from graphitic carbon having at least 73% graphite carbon in a binder stable at temperatures of at least 150° C. or a binder that decomposes into conducting species when exposed to reflow temperatures; 2) the metal-powder-filled paint layer has a resistivity of less than about 0.0005 $\Omega\cdot cm$ and comprises metal powder in a binder stable at temperatures of at least 200° C.; or 3) the negative metallic terminal has a conductivity of at least 90% the conductivity of pure copper, wherein at least the surface of the negative metallic terminal connected to the metal-powder-filled paint layer is plated with a protective coating to prevent oxidation of the negative metallic terminal, and wherein the protective coating is thermally stable at temperatures of at least 200° C.

2. The capacitor according to claim 1 wherein the valve metal is tantalum, aluminum, niobium, titanium, or mixtures, alloys, or metallic glasses thereof.

3. The capacitor according to claim 1 wherein the conductive layer formed on the dielectric layer is manganese dioxide, a conductive polymer, or a conductive salt.

4. The capacitor according to claim 1 wherein the thickness of the carbon layer is between about 0.0001 inches to about 0.003 inches.

5. The capacitor according to claim 1 wherein paint layer contains more than 80% metal content by weight after drying.

6. The capacitor according to claim 1 wherein the metal powder in the paint is silver, gold, nickel, copper, mixtures, or alloys thereof.

7. The capacitor according to claim 6 wherein the metal powder in the paint is silver.

8. The capacitor of claim 1 wherein the binder in the paint comprises a thermosetting epoxy, a thermosetting polyimide, or a silicone epoxy which does not melt or outgas at temperatures of at least 200° C.

9. The capacitor of claim 1 wherein the binder in the paint is substantially free from mobile ionic species after curing to minimize oxidation or corrosion when the cured paint is exposed to moisture.

10. The capacitor according to claim 1 wherein the negative metallic terminal is pure copper, silver, or an alloy having at least 90% conductivity of copper.

11. The capacitor according to claim 10 wherein the negative metallic terminal is pure copper.

12. The capacitor according to claim 1 wherein the protective coating is palladium, platinum, or gold.

13. The capacitor of claim 1 wherein the protective coating is further plated on the surface external to a protective conformal case of the finished capacitor.

14. The capacitor of claim 1 further comprising at least one positive metallic terminal connected to an anode lead wire embedded in the element wherein the positive metallic terminal has a conductivity of at least 90% the conductivity of pure copper.

15. The capacitor of claim 14 wherein the positive metallic terminal is joined to the anode lead by resistance welding, laser welding, or ultrasonic welding.

16. The capacitor of claim 1 wherein the negative metallic terminal comprises an endcap which covers the negative end of the element.

17. The capacitor of claim 16 further comprising a positive metallic terminal comprising an endcap which covers the positive end of the element.

18. The capacitor of claim 17 wherein the connection to the negative metallic terminal comprises a conductive metal-filled adhesive, and the connection to the positive metallic terminal comprises a weld.

19. The capacitor of claim 1 wherein the protective coating covers the whole region of the negative metallic terminal that will be encapsulated by a protective conformal case.

20. The capacitor of claim 1 wherein the protective coating further covers the whole region of the positive metallic terminal that will be encapsulated by a protective conformal case.

21. The capacitor of claim 1 wherein a solder plating is plated on the surface of the negative metallic terminal external to a protective conformal case of the finished capacitor.

22. The capacitor of claim 21 wherein the solder plating is tin or a tin-lead mixture.

23. The capacitor of claim 14 wherein a solder plating is plated on the surface of the positive metallic terminal external to a protective conformal case of the finished capacitor.

24. The capacitor of claim 1 wherein the negative metallic terminal is joined to the metal-powder-paint layer with a silver-filled conductive adhesive, a gold-filled conductive adhesive, or a nickel-filled conductive adhesive.

25. A valve metal capacitor comprising at least one anodized element having a dielectric layer formed on the element, a conductive layer formed on the dielectric layer, a graphitic carbon layer formed on the conductive layer, a metal-powder-filled paint layer formed on the graphitic carbon layer, and a negative metallic terminal attached to the paint layer; wherein at least two of 1) the graphitic carbon layer is formed from graphitic carbon having at least 73% graphite carbon in a binder stable at temperatures of at least 150° C. or a binder that decomposes into conducting species when exposed to reflow temperatures; 2) the metal-powder-filled paint layer has a resistivity of less than about 0.0005 $\Omega\cdot cm$ and comprises metal powder in a binder stable at temperatures of at least 200° C.; or 3) the negative metallic terminal has a conductivity of at least 90% the conductivity of pure copper, wherein the surface of the terminal is selectively plated with a protective coating to prevent oxidation of the negative metallic terminal and wherein the protective coating is thermally stable at temperatures of at least 200° C.

26. A valve metal capacitor comprising at least one anodized element having a dielectric layer formed on the element, a conductive layer formed on the dielectric layer, a graphitic carbon layer formed on the conductive layer, a metal-powder-filled paint layer formed on the graphitic carbon layer, and a negative metallic terminal attached to the paint layer; wherein 1) the graphitic carbon layer is formed from graphitic carbon having at least 73% graphite carbon in a binder stable at temperatures of at least 150° C. or a binder that decomposes into conducting species when exposed to reflow temperatures; 2) the metal-powder-filled paint layer has a resistivity of less than about 0.0005 Ω·cm and comprises metal powder in a binder stable at temperatures of at least 200° C.; or 3) the negative metallic terminal has a conductivity of at least 90% the conductivity of pure copper, wherein the surface of the terminal is selectively plated with a protective coating to prevent oxidation of the negative metallic terminal and wherein the protective coating is thermally stable at temperatures of at least 200° C.

27. A multiple element capactor comprising at least two capacitor elements wherein at least one of the elements is according to claim 1.

28. The multiple element capacitor of claim 27 further comprising at least one ceramic capacitor element.

29. The capacitor of claim 1 comprising more than one anodized element, each element having a set of positive and negative metallic terminals, wherein each set of metallic elements are collectively joined into a leadframe.

* * * * *